United States Patent [19]
Durnwald

[11] Patent Number: 5,971,553
[45] Date of Patent: Oct. 26, 1999

[54] MIRROR HOUSING WITH ELECTRICAL CONNECTOR

[75] Inventor: Mark W. Durnwald, Holland, Mich.

[73] Assignee: Gentex Corporation, Zeeland, Mich.

[21] Appl. No.: 09/250,716

[22] Filed: Feb. 16, 1999

[51] Int. Cl.⁶ .................................................. G02B 7/182
[52] U.S. Cl. .......................................... 359/871; 359/872
[58] Field of Search .................................... 359/871, 872, 359/874, 877, 878, 604, 601, 602; 248/468, 495, 496; 362/83.1, 71, 144

[56] References Cited

U.S. PATENT DOCUMENTS 5,178,448  1/1993  Adams et al. ........................... 362/83.1
5,659,423  8/1997  Schierbeek et al. ..................... 359/604

*Primary Examiner*—Cassandra Spyrou
*Assistant Examiner*—Mohammad Y. Sikder
*Attorney, Agent, or Firm*—Price, Heneveld, Cooper, DeWitt & Litton

[57] ABSTRACT

An interior rearview mirror is provided for vehicles having electrically operated components requiring connection to a power source with a blind assembly. The mirror includes a mirror housing having a back wall that defines an opening adapted to closely receive an electrical power source connector for operating components in the mirror. An electrical component connector in the housing is aligned with the opening and has substantially parallel sidewalls with a cross-sectional shape configured and adapted to stably engage the power source connector when the power source connector is attached to the component connector. The housing includes a protruding ridge that juts outwardly and protrudes from an exterior surface of the wall on one or more sides of the opening. The ridge includes angled inner surfaces forming a corner leading toward the opening. The ridge forms an enlarged target shaped to provide a feel to an installing person that facilitates assembly by directing the power source connector toward the component connector during a blind assembly.

23 Claims, 4 Drawing Sheets

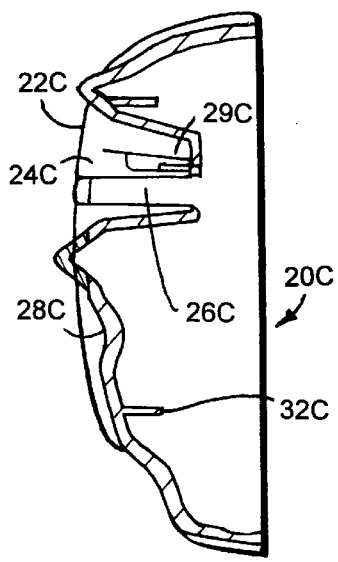
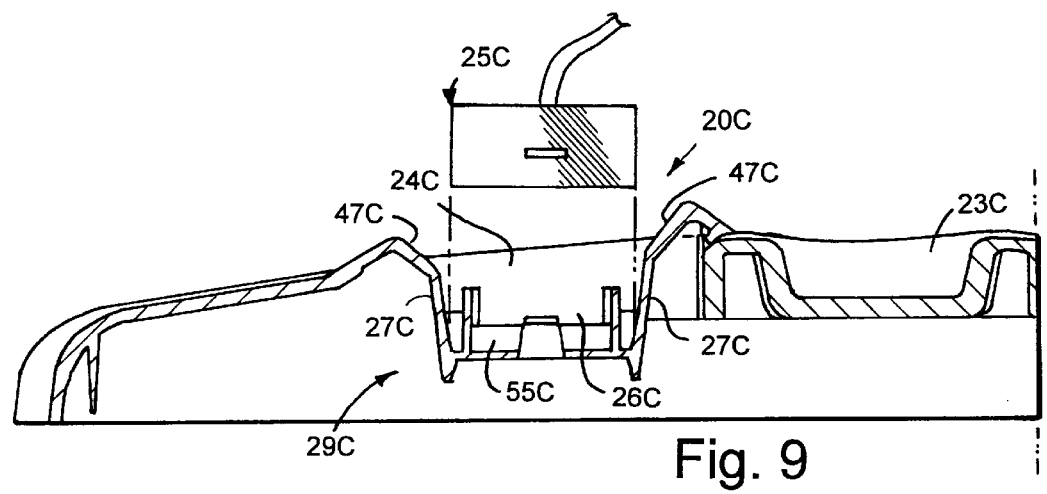

MIRROR HOUSING WITH ELECTRICAL CONNECTOR

BACKGROUND OF THE INVENTION

The present invention relates to mirrors having electrical connectors that must be connected to operate electrically operated components or circuits in the mirrors, and in particular the present invention relates to mirrors where a multi-contact electrical connector must be connected in a blind assembly process by an installing person that cannot easily visually verify alignment during connection.

Mirrors in modern vehicles often include electrically operated components and features that require separate electrical circuits. For example, electrochromic (EC) mirrors have circuits for controlled darkening of EC material. Further, these mirrors often have displays that convey information to a vehicle driver or sensors that sense particular vehicle data of interest. However, the connectors that electrically connect the components in the mirror to vehicle chassis wiring are not easy to reach or see, such that they require a blind assembly. This blind assembly problem is aggravated by multi-pin connectors, since alignment tends to be more critical and the possibility of damage to the connector is greater when the connector includes several pins. The blind assembly problem is further aggravated by the confined area defined around the mirror under the vehicle front window. For example, interior rearview mirror housings are located relatively close to the front window and headliner (or console) in vehicles, so that the mirrors are optimally located for viewing. Also, the adjustable mirror support that supports the mirror on the vehicle front window and/or on the vehicle overhead console is made relatively short so as to minimize pendulum-type vibrational problems caused by the mirror being supported on an elongated cantilevered arm. The proximity of the mirror to the vehicle front window makes it difficult to see the mating structures, and further restricts the assembly, making it difficult to align and connect the power source connector to the mirror component connector.

As noted above, the problem of difficult assembly is aggravated by the fact that typically the vehicle front window glass is attached before the mirror is attached or electrically connected. Thus, the vehicle front window glass is in the way and prevents the installing person from being able to visually see the connection. Further, the wire lead on the power source connector is, by design, made as short as possible and made to lay close to the vehicle front window to eliminate the lead from hanging down after assembly in a manner that would create a poor appearance. These "short length" wires can make it difficult for an assembling person to tell whether a resistance to assembly is caused by the connectors being misaligned or whether it is from other factors, such as tension on the wires.

As a result, the power source connector is not always fully aligned with the component connector when the installing person applies force to assemble the power source connector to the component connector. If not properly aligned, the connectors may bind and wedge in a manner potentially causing damage to the connectors. At a minimum, misaligned connectors will resist connection in a manner slowing the assembly process and frustrating the assembling person. This problem of misalignment, binding, wedging, and potential for damage increases as the number of electrical contacts in the connectors increase, and increases as the pins, contacts, and supporting structure are miniaturized.

Thus, an improved mirror apparatus and assembly method is desired solving the aforementioned problems and having the aforementioned advantages.

SUMMARY OF THE PRESENT INVENTION

In one aspect of the present invention, an interior rearview mirror is provided for vehicles having an electrically operated component requiring connection to a power source, where the power source includes a quick attach electrical power source connector having a predetermined cross-sectional shape. The mirror includes a mirror housing adapted to hold various mirror components including an electrical component connector for powering the mirror components. The mirror housing includes a wall with marginal material that defines an opening adapted to closely receive the power source connector. The electrical component connector defines a connector socket in the housing and is aligned with the opening and has substantially parallel sidewalls with a cross-sectional shape configured and adapted to stably engage the electrical power source connector. The housing includes at least one protrusion that juts outwardly from an exterior surface of the wall on at least one side of the opening, with the protrusion being configured to act as a target to direct the power source connector toward the electrical connector socket during a blind assembly where visual access is denied, thus facilitating assembly.

In another aspect of the present invention, an improvement is provided for an interior rearview mirror for vehicles, where the interior rearview mirror has a mirror housing adapted to hold at least one electrically powered mirror component, and further where the mirror has an electrical component connector configured for connection to an electrical power source connector having a predetermined cross-sectional shape. The improvement includes an opening in the wall adapted to receive the power source connector. The improvement further includes a protrusion on the wall of the mirror housing proximate the opening that is configured to direct the power source connector toward the component connector during blind assembly of the power source connector to the component connector.

In yet another aspect of the present invention, a method of assembling an interior rearview mirror includes steps of providing a mirror assembly, where the mirror assembly includes a housing with a wall and an electrical component connector located at an opening in the wall, and where the mirror assembly has an outwardly extending protrusion formed on the wall that indicates a position of the electrical component connector. The method includes electrically connecting the mirror assembly to a vehicle including extending an electrical power source connector blindly and without visual recognition into the electrical component connector while using the protrusion as a target indicator. In a narrower aspect, the method includes providing an angled surface on the protrusion to provide an enlarged target. The step of attaching includes ramping the electrical power source connector along the angled surface into the electrical component connector.

These and other aspects, objects, and features of the present invention will be further understood by persons of ordinary skill in the art by reference to the following specification, claims, and appended drawings.

DESCRIPTION OF DRAWINGS

FIGS. 8 and 9 are cross-sectional views of a third modified mirror housing embodying the present invention, FIGS. 8 and 9 being similar to FIGS. 3 and 4, but showing a protruding ridge around the opening in the mirror housing.

DESCRIPTION OF PRIOR ART

Figure 2:
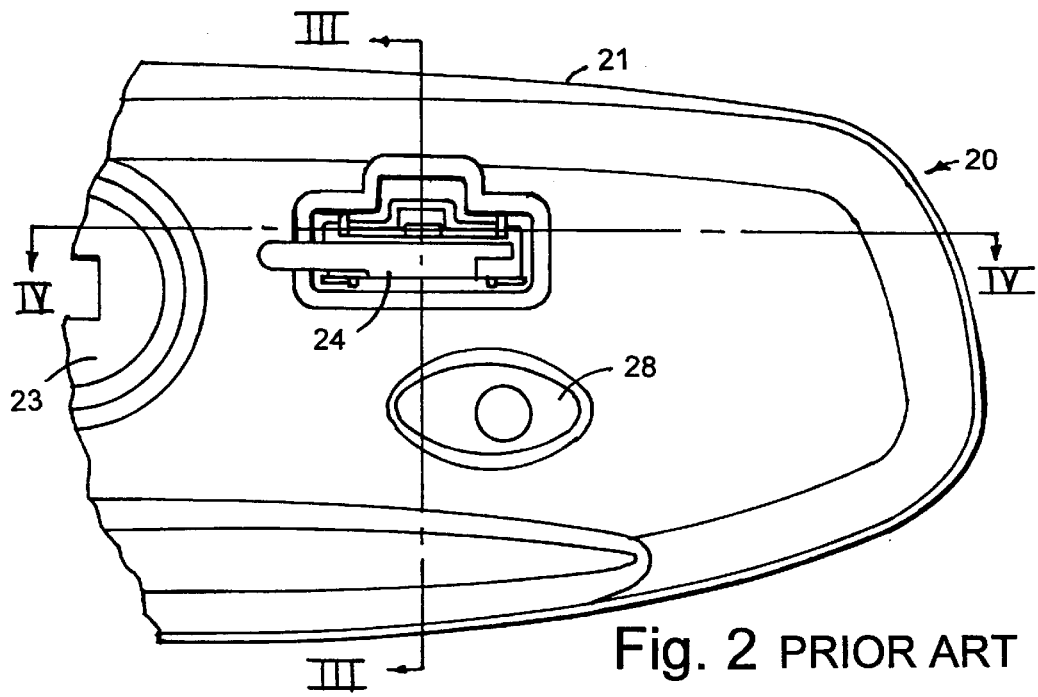
FIG. 2 is an elevational back view of the mirror in FIG. 1.
Figure 1:
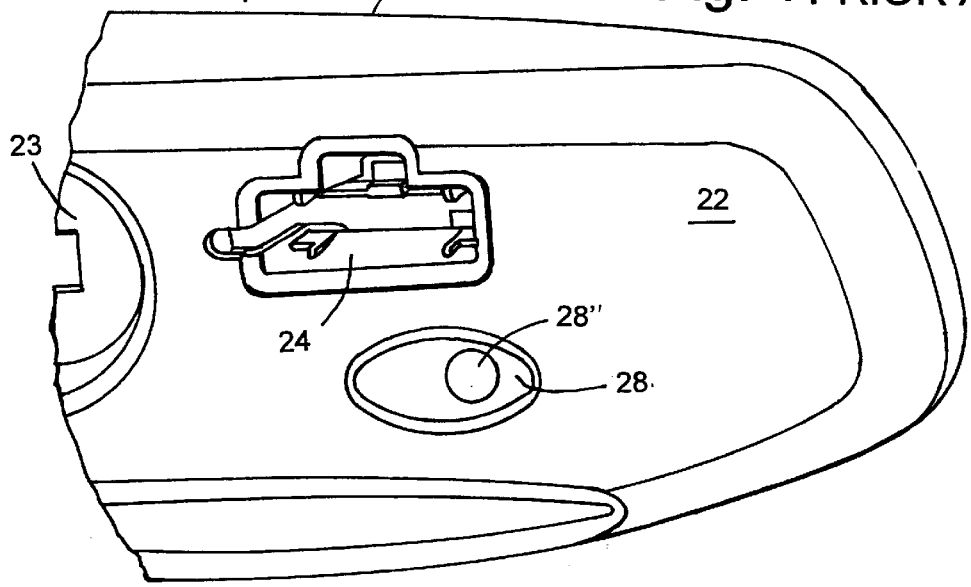
FIG. 1 is a fragmentary perspective view of a back surface of half of a prior art mirror.
Figure 3:
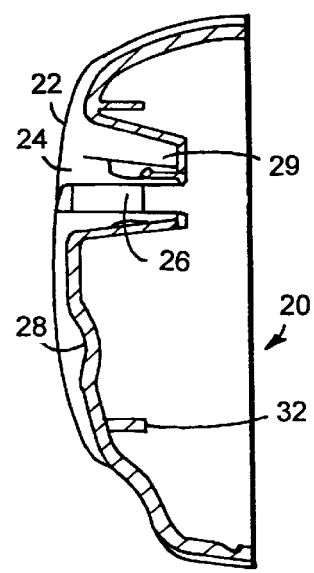
FIGS. 3 and 4 are cross-sectional views taken along the lines III—III and IV—IV in FIG. 2.
Figure 4:
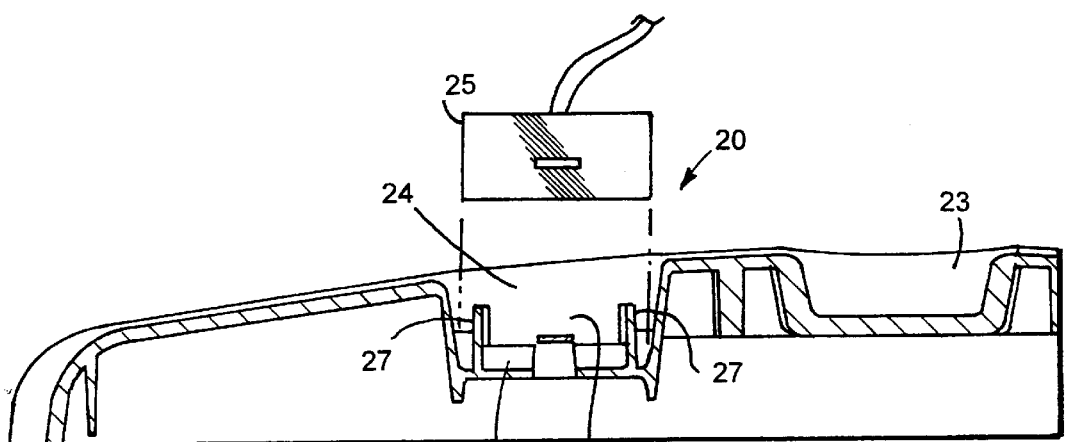

The illustrated prior art interior rearview mirror 20 (FIGS. 1–4) includes a concavely shaped mirror housing 21 adapted to hold various mirror components in a vehicle, such as are commonly found in electrochromic (EC) mirrors or in mirrors adapted to display information electronically. For example, EC mirrors have EC material located between glass mirror elements that darkens upon a voltage being applied across the EC material. Further, the EC mirrors often have display components that convey information to a vehicle driver or that sense vehicle information, such as direction, temperature, daylight, keyless entry signal sensors, and the like. Where there are multiple electrically operated components, the EC mirrors require multi-contact connectors so that multiple wires can be individually connected. The illustrated mirror housing 21 includes a "back" wall 22 with a recess structure 23 thereon configured to receive an adjustable window-mounted mirror support (not specifically shown, but well-known in the art), and a shallow recess 28 for receiving a photocell 28' related to sensing light outside the vehicle. (Notably, the wall 22 is referred to as a "back wall" herein, even though it faces forwardly in the vehicle.) The shallow recess 28 increases the amount of light that strikes the photocell 28' by increasing the angle of access to the photocell 28'. The wall 22 has marginal material that defines an opening 24 generally adjacent but spaced from the structure 23. The opening 24 is adapted to receive a multi-contact electrical power source connector 25 (FIG. 4). An electrical connector socket 26 is defined by opposing walls 27 in the housing 21. The illustrated opposing walls 27 are molded integrally as part of the housing 21. The opposing walls 27 are substantially parallel and are configured to stably engage an electrical power source connector 25 when the power source connector 25 is attached to a multi-contact electrical component connector 29 located in the socket 26. A problem is that the power source connector 25 is not easily aligned with the component connector 29, particularly since the mirror 20 is attached after the front window is in the vehicle. Thus, the vehicle front window glass is "in the way," and interferingly prevents the installing person from being able to easily visually see the connection. Further, the assembling person is in an awkward position with their hands lifted upwardly and toward a front of the vehicle over an instrument panel area of the vehicle. Hence, the power source connector 25 is not always fully aligned with the component connector 29 when the installing person applies force to assemble the power source connector 25 to the component connector 29. For example, the power source connector 25 can catch on a top of the opposing walls 27, thus aggravating misalignment problems. If not properly aligned, the connectors 25 and 29 may bind and wedge in a manner potentially causing damage to the connectors 25 and/or 29, or at least will resist connection in a manner slowing the assembly process and frustrating the assembling person. This problem of misalignment, binding, wedging, and potential for damage increases as the number of electrical contacts in the connectors 25 and 29 increase, or as the contacts and supporting structure are miniaturized.

DETAILED DESCRIPTION OF PREFERRED EMBODIMENT

Figure 5:
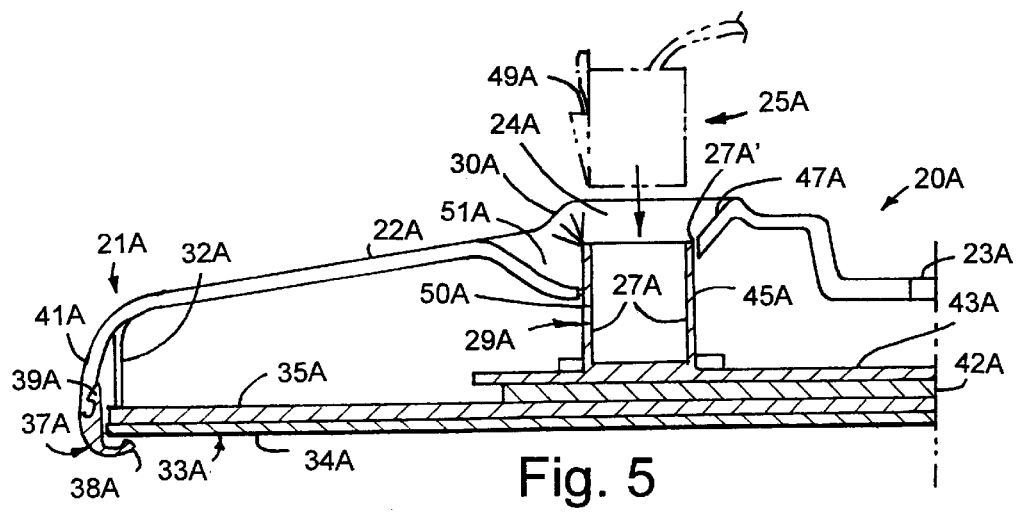
FIG. 5 is a cross-sectional view of half of a mirror embodying the present invention, the cross-sectional view being similar to the mirror shown in FIG. 1, but showing inventive aspects of the present invention including an opening in the back wall, a connector socket in the housing aligned with the opening, and a protruding ridge formed in the back wall on four sides around the connector socket.

An interior rearview mirror 20A (FIG. 5) embodying the present invention includes many components and features that are similar to the prior art mirror described above. In order to reduce redundant discussion, and further to provide an understanding of the present invention over the prior art, the interior rearview mirror 20A described below uses numbers that are the same as the numbers on similar components and features of the interior rearview mirror 20, but with addition of the letter "A."

The interior rearview mirror 20A (FIG. 5) includes a mirror housing 21A having a ridge or protrusion 30A that juts outwardly and protrudes from an exterior surface of a back wall 22A of the mirror housing 21A. The protrusion 30A includes angled housing surfaces 47A forming a chute configured to direct a power source connector 25A into mating engagement with a component connector 29A in the mirror 20A. The protrusion 30A acts as an enlarged target that is easily identifiable by feel by an installing person. The protrusion 30A is shaped to guide the power source connector 25A into operative engagement with the component connector 29A, thus facilitating assembly despite lack of visual access by the installing person.

More specifically, the mirror housing 21A (FIG. 5) is an injection-molded concave part having various ribs 32A and surfaces particularly shaped to rigidify the housing 21A and to support and provide attachment for components inside the mirror. For example, the illustrated ribs 32A are configured to accurately and uniformly support an EC mirror element 33A. The EC mirror element 33A includes exterior and interior glass 34A and 35A having a perimeter-positioned seal and EC material located between the glass 34A and 35A. A J-shaped perimeter bezel 37A includes an inner end 38A configured to engage the exterior glass 34A, and further includes a hooked end 39A configured to snap attach to a recess in a forwardly extending perimeter flange 41A of the housing 21A. A printed circuit (PC) board support 42A (e.g., a foam spacer) is attached to an inside surface of the interior glass 35A. The support 42A and the EC material are connected to a circuit on the PC board 43A in the housing 21A. The mirror 20A includes a plurality of electrical components, such as a circuit that controls darkening of the EC material. Many other features and components can be added to the mirror 20A, such as indicators and displays for showing a compass direction, inside and outside temperatures, daylight sensors, keyless entry sensors, and other vehicle related sensing and displaying components.

The back wall 22A is concavely shaped and contoured for aesthetics and to minimize the area of visual obstruction to a vehicle driver looking out the front window of a vehicle.

The structure 23A is configured to engage a socket (not specifically shown) on the mirror housing 21A to form a part of an adjustable double-pivoted cantilevered support commonly used on interior rearview mirrors. Such double-pivoted cantilevered supports are well-known in the art and need not be discussed herein for an understanding of the present invention. For reference, it is contemplated that the present mirror construction 20A will work very well with a cantilevered support having ball-and-socket adjustable connections at both ends of the cantilevered support.

The focus of the present invention is in the area of opening 24A. The opening 24A (FIG. 5) in the back wall 22A is generally rectangular. The illustrated component connector 29A is attached in the mirror housing 21A to a PC board 43A, although it is contemplated that it could be supported directly on the mirror housing 21A instead. The component connector 29A includes opposing walls 27A that generally align with the opening 24A and that extend from inside the mirror 20A to a location 27A' slightly under the angled inner surface 47A of protrusion 30A described below. In the illustrated mirror 20A, the opposing walls 27A are formed by a molded portion 45A of the component connector 29A. However, it is contemplated that the opposing walls 27A can also be wholly or partially formed integrally from the contiguous material of housing 21A, such as from the material forming inner surface 47A, or that the component connector 29A can be fully integrated into the mirror housing 21A, as illustrated in FIGS. 8 and 9 described below.

The molded portion 45A (FIG. 5) of component connector 29A extends around the contacts of component connector 29A. A resiliently supported hook 49A on the power source connector 25A is configured to snappingly engage a lip or notch 50A (not specifically shown) on the component connector 29A to secure the power source connector 25A in an assembled position. A shallow depression 51A is formed in the protrusion 30A and in the marginal material around the opening 24A, so that a repairman can extend their finger or a tool against the resiliently supported hook 49A to release the power source connector 25A for repair. The engagement of hook 49A on lip 50A, in combination with opposing walls 27A, is configured to retain the contacts of the power source connector 25A in a square and fully seated position against the contacts of the component connector 29A. The illustrated component connector 29A is attached to and supported on the PC board 43A, although it can be attached to other parts of housing 21A. It can be attached with screws, adhesive, solder, mechanical snap attachment, or other means. The opposing walls 27A of molded part 45A of power source connector 25A include flat parallel side surfaces adapted to slidably telescope into mating engagement with the component connector 29A. Their telescoping engagement not only aligns contacts and/or pins of connectors 25A and 29A, but further keeps all contacts and pins in full electrical engagement so that a short circuit or broken circuit does not result. As well-known in the art, any substantial angling of the power source connector 25A relative to the component connector 29A can be problematic because one or more contacts and pins could separate, creating malfunctions. It is contemplated that the connectors 25A and 29A can be many different styles and can include many different numbers of pins, such as 5 pin, 7 pin, 12 pin, or more.

The illustrated protrusion 30A (FIG. 5) is integrally molded of contiguous material as part of back wall 22A (although it is contemplated that it could be a separate piece attached to housing 21A and still be within a scope of the present invention). The protrusion 30A extends along three adjacent sides of the opening 24A and partially onto both ends of the fourth side adjacent finger recess 51A. It is contemplated that protrusion 30A could be extended along only one or two sides of the opening 24A, or only at a corner, if desired. The illustrated protrusion 30A is continuous (although it could be discontinuous, or could even be a single post-like member). The protrusion 30A includes an inner surface 47A that is angled inwardly toward the socket 26A at about 45 degrees. The inner surface 47A can be different shapes, but it is contemplated that a preferred shape will include a relatively linear section that angles at about 45 degrees. The optimal angle will of course depend upon the frictional characteristics of the power source connector 25A as it engages the inner surface 47A. Using common polymeric materials for the housing 21A and the power source connector 25A, an angle of about 45 degrees is presently believed to be optimal. Using the 45-degree angle, the protrusion 30A provides a significantly enlarged target area. For example, by extending the protrusion 30A outwardly about 2 to 3 mm on one side, the target area of the opening 24A is enlarged from about 17 mm to about 20 mm in that dimension. Where the protrusion 30A extends on two opposing or adjacent sides, this enlarges the target area by about twenty percent (20%) or more. Where the protrusion 30A extends onto all four sides of the opening 24A as well as down into the mirror housing 21A, the target area can be enlarged by as much as fifty percent (50%) or more. Further, where the protrusion 30A forms a relatively well-defined defined corner, it is easily identifiable by feel by a person assembling the power source connector 25A to the component connector 29A with a blind assembly.

The angled inner surfaces 47A (FIG. 6) form a corner 47A' that acts as a funnel or guide that directs the power source connector 25A toward component connector 29A during assembly. This motion is easily repeated and provides the installing person with a feel that lets he/she know when alignment has been accomplished and when full pressure can be applied to fully close and snap attach the connection. Further, the protrusion 30A including corner 47A' act as feel indicators or references so that the installing person knows which way the power source connector 25A needs to be moved for alignment to allow assembly. The corner 47A' allows the installing person to slide the power source connector 25A against the corner and then the slide power source connector 25A into mating engagement with the component connector 29A with consistently uniform assembly process that is relatively easy, predictable, repeatable, and installer friendly. An upper/outer edge of the molded part 45A is positioned below or immediately adjacent the inner edge of the angle surface 47A so that assembly is further facilitated.

Figure 6:
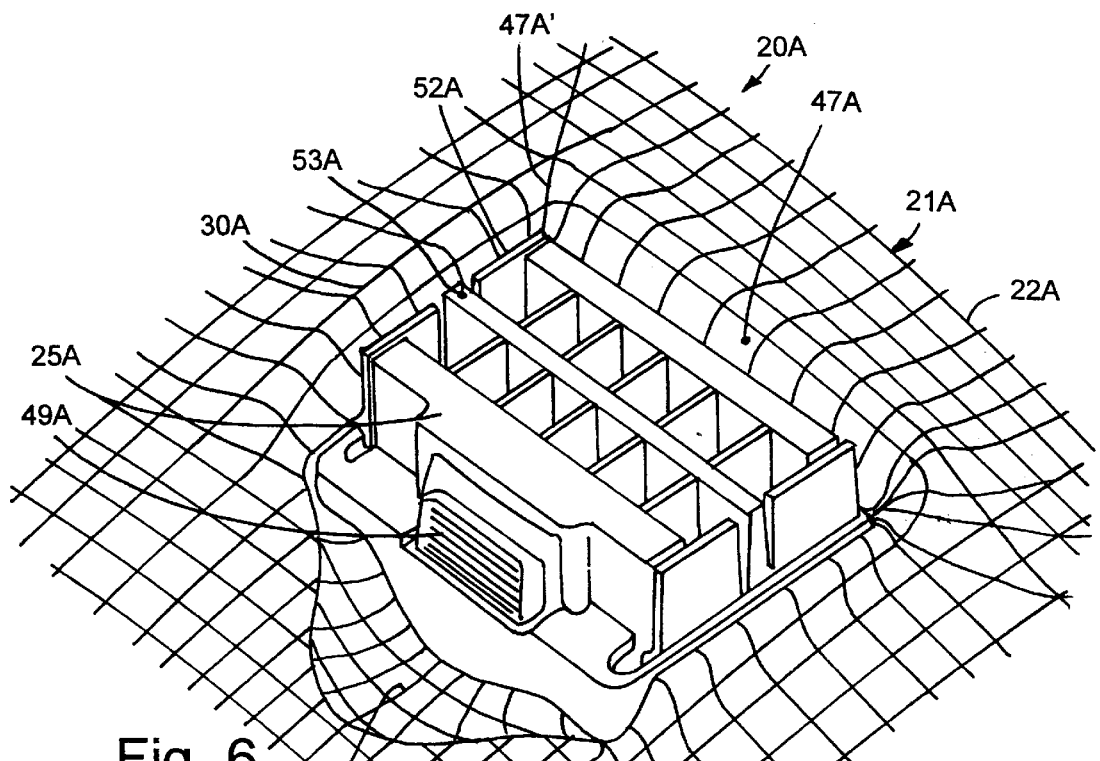
FIG. 6 is a fragmentary perspective view of the mirror housing of FIG. 5, including the socket area and ridge around the component connector and including a 12-pin power source connector attached to the component connector, but with the wires to the power source connector removed to better show the structure around the connectors.

As shown in FIG. 6, a 12-pin power source connector 25A fits into the opening 24A, with a finger recess 51A formed in one side of the opening 24A for accessing a releasable hook 49A on the power source connector 25A by a repairman. The illustrated electrical power source connector 25A includes tabs 52A and walls 53A that jut rearwardly in the socket 26A to a location facilitating assembly. In this way, the power source connector 25A provides a protruding portion that, in combination with the protrusion 30A, facilitates blind assembly by allowing an installer to confirm proper alignment by forming a fingertip-sized ring-shaped perimeter recess around a periphery of the power source connector 25A as the two connectors engage. The fingertip-sized recess further facilitates and helps the installing person during the assembly process by letting him/her use his/her fingertips as fixture-like spacers to align power source connector 25C with component connector 29C.

Figure 7:
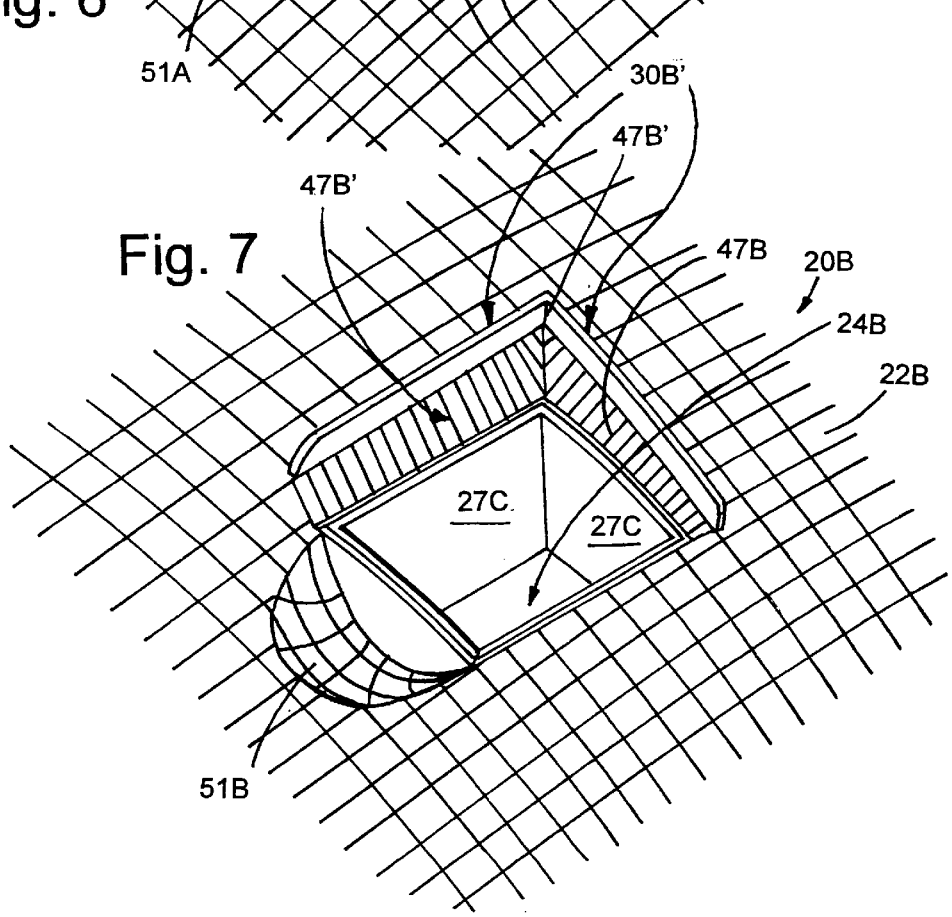
FIG. 7 is a perspective view similar to FIG. 6, but showing a second embodiment of the mirror housing including a sharply defined thin-walled protrusion.

Second and third mirror housings 21B (FIG. 7) and 21C (FIGS. 8 and 9) include features and components identical or similar to mirror housing 21A, which features and components are identified with similar numbers but with the addition of the letters "B" and "C." Mirror housing 21B (FIG. 7) also includes angled surfaces 47B, but further includes an L-shaped sharply defined protrusion or rib 30B' that protrudes perpendicularly from the exterior surface of back wall 22B. The angled inner surfaces 47B are formed separate from but adjacent the L-shaped rib 30B'. The rib 30B' has a constant thickness wall section that extends about 2 to 3 mm from a rear surface of the mirror housing 22B, and it defines a relatively sharp corner 47B' that is easy to feel.

Mirror 20C (FIGS. 8 and 9) integrates the structure of component connector 29C into the material of back wall 22C. Specifically, the contiguous integral material of back wall 22C is used to form the multiple ribs 55C forming the recesses for holding conductive elements for electrically engaging the 12-pins on power source connector 25C. Protrusion 30A forms a ridge around the opening 24C with angled side surfaces 47C. The protrusion 30A is integrally formed by the marginal material around opening 24C.

Thus, the present mirror is particularly adapted to facilitate a blind assembly by providing a protrusion or protrusions having an angled surface forming an enlarged target area that helps an installing person feel a correct alignment of the power source connector with an electrical component connector on a mirror. The protrusion further provides an identifying reference letting the installing person know which way the power source connector must be moved for alignment, and still further provides a corner for pressing the power source connector against during the alignment process.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An interior rearview mirror for vehicles having an electrically operated component requiring connection to a power source, the power source including a quick attach electrical power source connector having a predetermined cross-sectional shape, comprising:

a mirror housing to hold various mirror components including an electrical component connector for powering the mirror components, the mirror housing including a wall having marginal material that defines an opening to closely receive the power source connector, the electrical component connector defining a connector socket in the housing aligned with the opening and has substantially parallel sidewalls with a cross-sectional shape configured and stably engages the electrical power source connector, the housing including at least one protrusion that juts outwardly from an exterior surface of the wall on at least one side of the opening, the protrusion being configured to act as a target to direct the power source connector toward the electrical connector socket during blind assembly where visual access is denied, thus facilitating assembly, and wherein the protrusion includes an outwardly flared and angled surface on an inner side adjacent the connector socket, and forms a relatively well defined ramp in order to align said power source connector.

2. The interior rearview mirror defined in claim 1, wherein the flared and angled surface forms a ramp leading toward the connector socket.

3. The interior rearview mirror defined in claim 2, wherein the flared and angled surface includes an angled linear section integrally formed as part of the marginal material that forms a chute that leads into the connector socket.

4. The interior rearview mirror defined in claim 1, wherein the protrusion includes protruding ridge sections formed along at least two sides of the connector socket.

5. The interior rearview mirror defined in claim 4, wherein the protruding ridge sections are located on adjacent sides of the connector socket and form a corner inclined toward the connector socket.

6. The interior rearview mirror defined in claim 5, wherein the protruding ridge sections are located on three sides of the connector socket.

7. The interior rearview mirror defined in claim 1, wherein the protrusion includes inner surfaces angled toward the electrical connector socket, with the inner surfaces increasing a target area of the connector socket by at least about 10 percent.

8. The interior rearview mirror defined in claim 1, wherein the protrusion includes a protruding corner section located at a corner formed by the connector socket.

9. The interior rearview mirror defined in claim 1, wherein the protrusion comprises a vertical rib that extends along a side of an opening defined by the connector socket.

10. The interior rearview mirror defined in claim 9, including an access recess formed in the wall along a particular side of the opening, the access recess being shaped to allow access to a finger-release tab on one of the electrical component connector and the power source connector.

11. The interior rearview mirror defined in claim 9, wherein the wall includes angled surfaces that extend from the rib toward the opening.

12. The interior rearview mirror defined in claim 1, wherein a height of the protrusion is at least about 2 mm higher than an outer surface of the wall.

13. The interior rearview mirror defined in claim 1, wherein a width of an area defined by the protrusion is at least about 2 mm greater than a width of an area defined by the connector socket.

14. The interior rearview mirror defined in claim 1, wherein the protrusion is integrally formed from the marginal material of the wall.

15. The interior rearview mirror defined in claim 1, wherein the wall comprises a back wall of the housing.

16. The interior rearview mirror defined in claim 15, wherein the back wall includes curvilinear contoured surfaces adjacent an opening defined by the connector socket.

17. The interior rearview mirror defined in claim 1, wherein the electrical component connector is a separate component that is mounted to the mirror housing in the mirror housing.

18. The interior rearview mirror defined in claim 17, including a PC board mounted in the housing, and wherein the electrical component connector is mounted directly to the PC board.

19. In an interior rearview mirror for vehicles, where the interior rearview mirror has a mirror housing adapted to hold at least one electrically powered mirror component, and further has an electrical component connector configured for connection to an electrical power source connector having a predetermined cross-sectional shape, an improvement comprising:

the mirror housing including a component connector socket and further a wall defining an opening to receive the power source connector, and further including a protrusion proximate the opening that is configured to direct the power source connector toward the component connector socket during blind assembly of the power source connector to the component connector socket where visual access is denied, thus facilitating assembly, and wherein the protrusion includes an outwardly flared and angled surface on an inner side adjacent the connector socket, and forms a relatively well defined ramp in order to align said power source connector.

20. The interior rearview mirror defined in claim 19, wherein the protrusion extends outwardly from the mirror housing.

21. The interior rearview mirror defined in claim 20, where the protrusion defines an enlarged target with angled sides adapted to direct the power source connector toward the opening during assembly of the power source connector to the component connector.

22. A method of assembling an interior rearview mirror comprising steps of:

providing a mirror assembly including a housing with a wall and an electrical component connector located at an opening in the wall, the mirror assembly having a connector socket and further an outwardly extending protrusion formed on the wall that indicates a position of the electrical component connector; and electrically connecting the mirror assembly to a vehicle including extending an electrical power source connector blindly and without visual recognition into the electrical component connector while using the protrusion as a target indicator, and providing the protrusion including an outwardly flared and angled surface on an inner side adjacent the connector socket, and forming a relatively well defined corner in order to align said power source connector.

23. The method defined in claim 22, wherein the step of providing a mirror assembly includes providing at least one angled surface on the protrusion to provide an enlarged target, and wherein the step of attaching includes ramping the electrical power source connector along the angled surface into the electrical component connector.

* * * * *